United States Patent [19]
Zylstra

[11] Patent Number: 5,016,135
[45] Date of Patent: May 14, 1991

[54] POWER SUPPLY INCORPORATING CIRCUIT BREAKER AND FAULT DETECTION CIRCUIT

[75] Inventor: Henry J. Zylstra, Alburnett, Iowa

[73] Assignee: Square D Company, Palatine, Ill.

[21] Appl. No.: 552,374

[22] Filed: Jul. 16, 1990

Related U.S. Application Data

[63] Continuation of Ser. No. 340,323, Apr. 19, 1989, abandoned.

[51] Int. Cl.[5] .................. H02H 7/08; H02H 7/125
[52] U.S. Cl. .................................. 361/156; 361/16;
361/47; 363/53; 363/87
[58] Field of Search ............... 361/42, 47, 48, 160,
361/170, 187, 189, 190, 205, 93, 98, 100;
323/237, 246, 300, 320, 325; 363/52, 53, 126, 87

[56] References Cited

U.S. PATENT DOCUMENTS

| | | | |
|---|---|---|---|
| 3,379,939 | 4/1968 | Obenhaus | 361/205 |
| 3,671,815 | 6/1972 | Eberle et al. | 361/187 |
| 4,042,964 | 8/1977 | Nurnberg et al. | 361/205 |
| 4,068,276 | 1/1978 | Pintell | 361/46 |
| 4,258,403 | 3/1981 | Shimp | 361/42 |
| 4,412,278 | 10/1983 | Cambier et al. | 363/53 |
| 4,584,623 | 4/1986 | Bello et al. | 361/187 |
| 4,598,331 | 7/1986 | Legatti | 361/46 |
| 4,734,817 | 3/1988 | Baker et al. | 361/190 |

FOREIGN PATENT DOCUMENTS

| | | |
|---|---|---|
| 0154450 | 9/1985 | European Pat. Off. . |
| 2000398 | 1/1979 | United Kingdom . |
| 2162708 | 2/1986 | United Kingdom . |

*Primary Examiner*—Peter S. Wong
*Attorney, Agent, or Firm*—Jose W. Jimenez; Nicholas A. Camasto

[57] ABSTRACT

A power supply incorporating a fault detection circuit controlling a circuit breaker is described. The power supply is isolated from relatively large applied DC voltages. This isolation is provided by a coupling capacitor in each of the line leads. The tripping energy for the circuit breaker can be provided either directly from the full wave rectifier output, or directly from the line lead or leads. In the case of the former, a reservoir capacitor may be used for storage of charge for tripping of the circuit breaker.

5 Claims, 5 Drawing Sheets

POWER SUPPLY INCORPORATING CIRCUIT BREAKER AND FAULT DETECTION CIRCUIT

This is a continuation of co-pending application Ser. No. 07/340,323 filed on Apr. 19, 1988, now abandoned.

FIELD OF THE INVENTION

The present invention relates to power supplies for DC equipment such as electronic circuits. More specifically the invention relates to a power supply incorporating a fault detection circuit controlling a circuit breaker.

BACKGROUND OF THE INVENTION

One of the problems to be overcome in devising a power supply is that of providing protection in the event of a DC dielectric test during installation. The voltage applied during such a test is typically 500 volts DC, which is capable of damaging circuits unless protective measures are taken.

SUMMARY OF THE INVENTION

According to the teachings of the present invention, there is provided a power supply incorporating a circuit breaker and a controlling fault detection circuit, the power supply having line, neutral and earth leads, and an AC to DC full wave rectifier, in which the line lead includes a coupling capacitor for DC isolation.

An object of the present invention is to provide a power supply having DC dielectric test protection and that is capable of driving a fault detection circuit and associated power supply.

These and other features, advantages and objects of the invention will be more clearly understood from the following description of some embodiments thereof, given by way of example only with reference to the accompanying drawings.

DETAILED DESCRIPTION OF THE PREFERRED EMBODIMENTS

Figure 1:
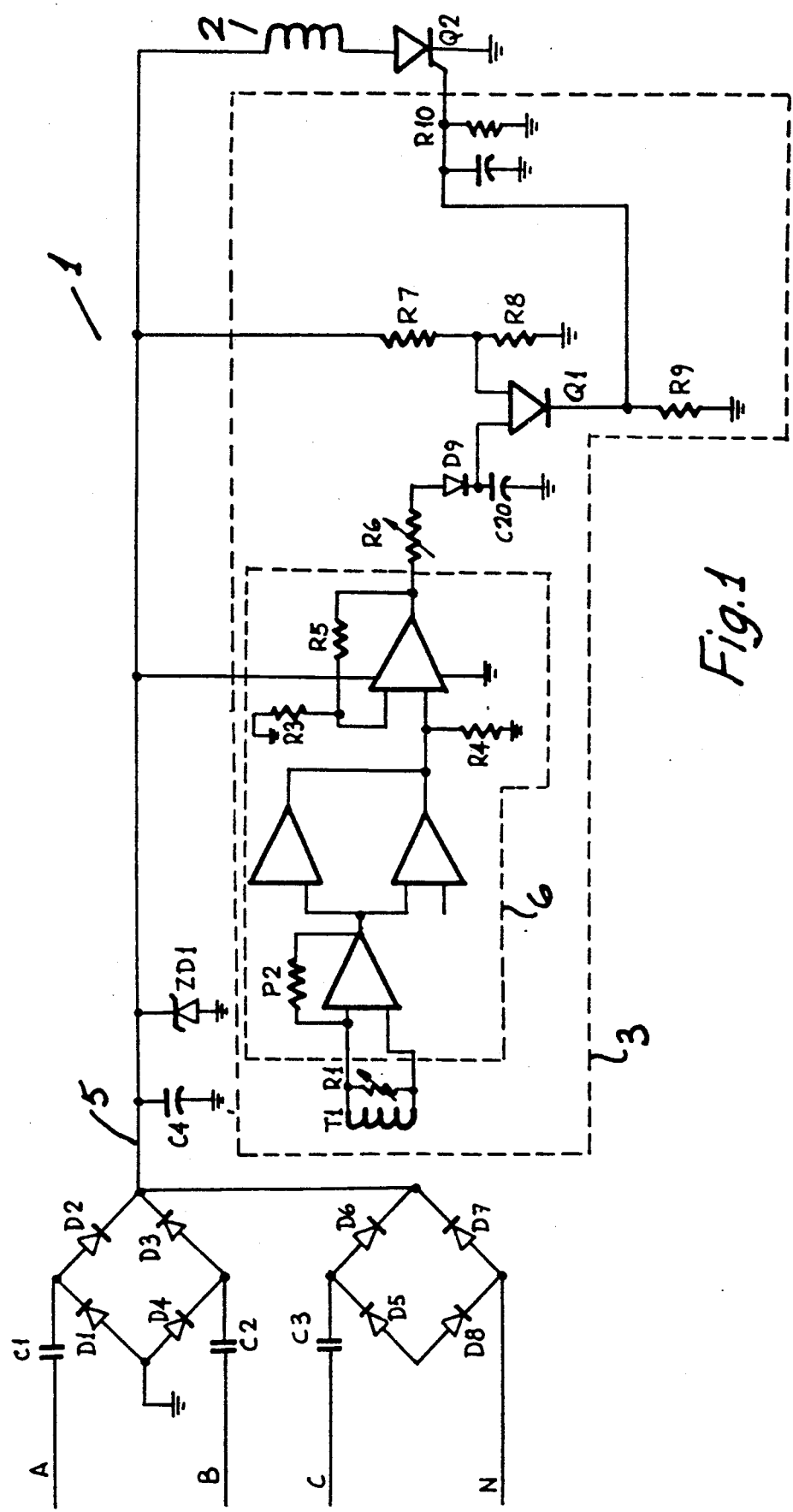
FIG. 1 is a circuit diagram of a power supply incorporating a ground fault detection circuit and associated circuit breaker.

Referring now to FIG. 1, there is illustrated a power supply according to the invention indicated generally by the reference numeral 1. The power supply 1 incorporates a circuit breaker including an SCR Q2 and an associated solenoid 2, the SCR Q2 being controlled by a ground fault detection circuit 3 which is indicated by interrupted lines in FIG. 1. The power supply 1 is connected to a three phase supply and includes line leads A, B and C and a neutral lead N. Line leads A and B are connected to a full wave bridge rectifier comprising diodes D1 to D4. The line lead C together with the neutral lead N are the input of a second full wave bridge rectifier formed by diodes D5 to D8. The outputs of the rectifiers are interconnected at an output lead 5 and the negative outputs are earthed. The output lead 5 drives the ground fault detection circuit 3 and is also connected to the solenoid 2 to provide tripping energy for the circuit breaker. A storage capacitor C4 and a Zener diode ZD1 are connected across the bridge rectifier output. The line leads A, B and C include coupling capacitors C1, C2 and C3 respectively for DC isolation.

The ground fault detection circuit 3 is of conventional construction and comprises a current transformer T1 having a pair of opposed primary windings connected to a comparator circuit 6 connected at it's output to a variable resistor R6. The variable resistor R6 is connected by a forward blocking diode D9 to a capacitor C20 which is in turn connected to an transistor Q1. The output of the amplifier Q1 is connected to the gate of the SCR Q2. On detection of a ground fault, the comparator 6 output is high and the capacitor C20 charges through R6 so that the SCR Q2 is triggered by the transistor Q1.

In operation, the power supply 1 is used to provide power to electronic or other devices that are subjected to DC isolation or dielectric tests commonly referred to as "megger" tests. In this embodiment, the capacitors C1, C2 and C3 provide isolation during such tests and each has a value of 0.1 microfarad, giving an AC impedance of approximately 26.5k ohms at 60 Hz. Accordingly, only several milliamperes of current is supplied to the circuit. In this way, isolation is provided from a high DC voltage applied to the power supply while sufficient current is provided to operate the sensing and delay function of the circuit breaker and the ground fault detection circuit 3. A certain amount of energy is stored in the storage capacitor C4 to assist in maintaining the SCR Q2 in conduction on tripping of the circuit breaker.

Figure 2:
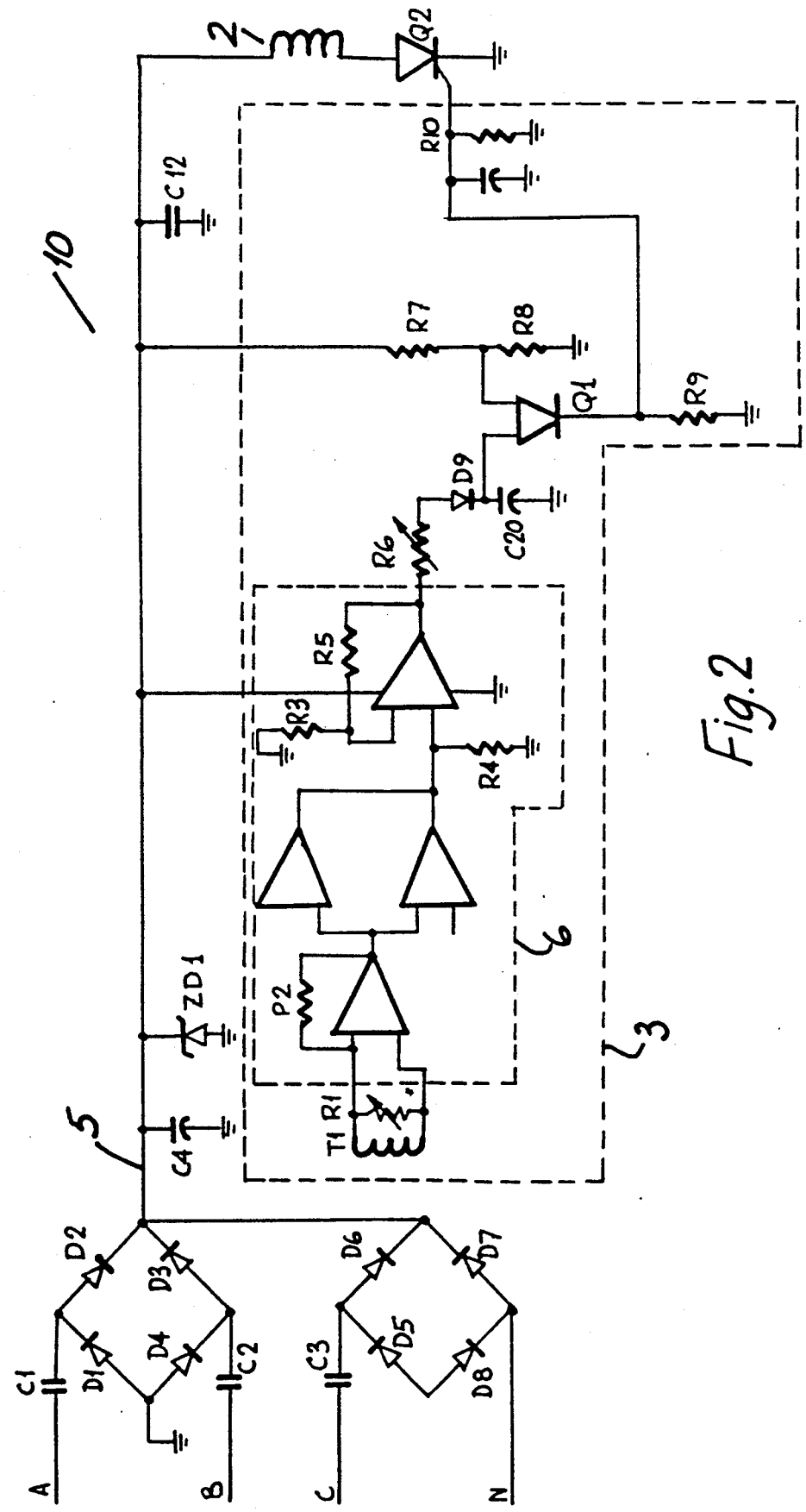
FIG. 2 is a circuit diagram of a modified power supply including a reservoir capacitor for delivery of additional tripping energy.

Referring now to FIG. 2 there is illustrated an alternative power supply generally by the reference numeral 10. Parts similar to those described with reference to FIG. 1 are identified similarly. The only difference between the power supply 10 and the power supply 1 is that an additional reservoir capacitor C12 is connected across the rectifier output for provision of additional tripping energy. The reservoir capacitor C12 causes a time delay in tripping of the circuit breaker. This arrangement is suitable when significantly more current is required during the tripping operation.

Figure 3:
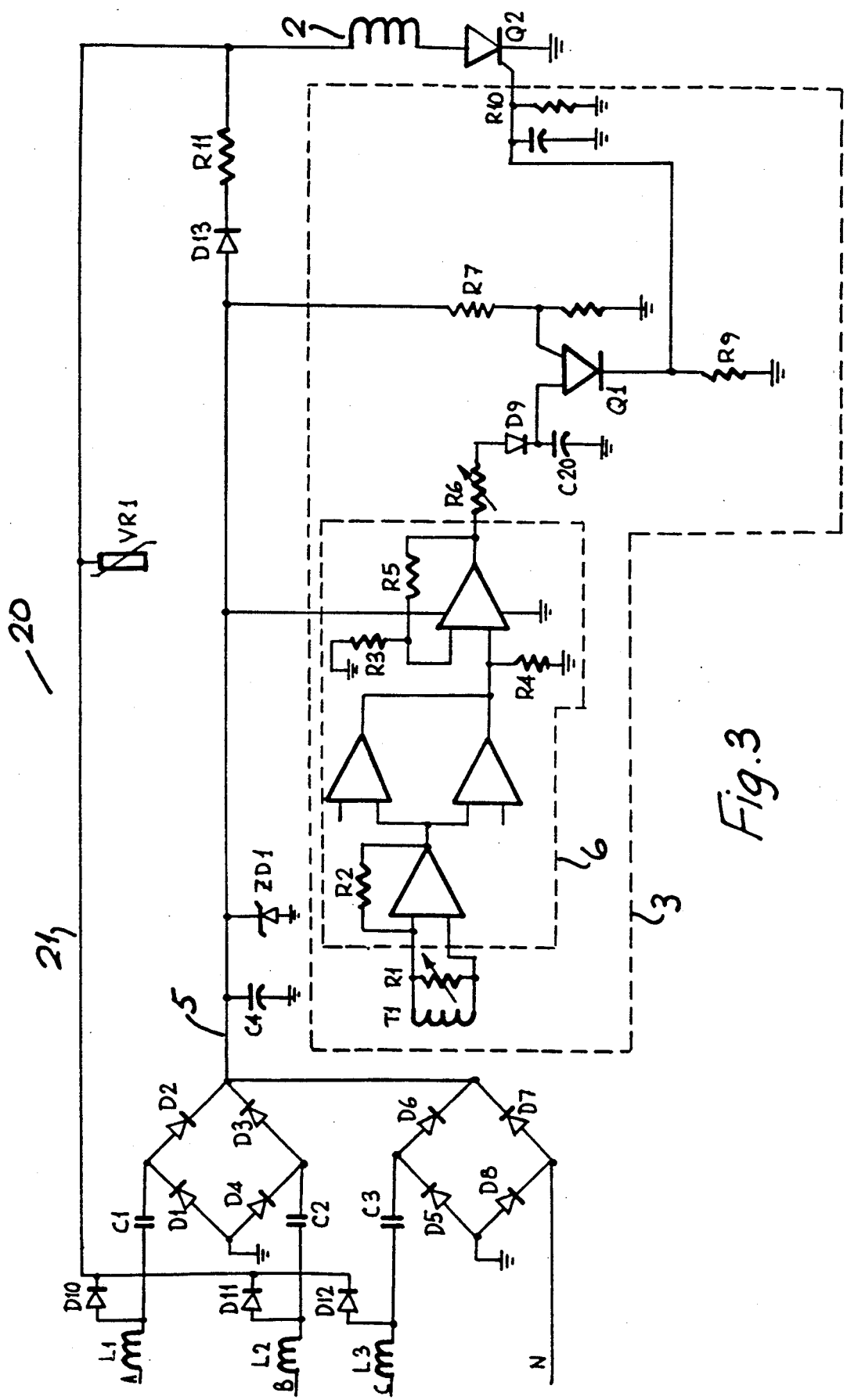
FIG. 3 is a circuit diagram of a further construction of a power supply having an arrangement for direct supply of tripping energy for the circuit breaker.

Referring now to FIG. 3 there is illustrated a further power supply according to the invention indicated generally by the reference numeral 20. Parts similar to those described with reference to the previous drawings are identified similarly. The important feature of the power supply 20 is that the line leads A, B and C are connected directly to the circuit breaker solenoid 2 to provide the tripping energy. The connection is made by a lead 21 to which each of the line leads A, B and C is connected through diodes D10, D11, and D12 respectively. The lead 21 includes a spike suppression varistor VR1. The rectifier output lead 5 is also connected to the solenoid 2 through a diode D13 and a resistor R11. In operation, the power supply 20 provides the tripping energy only when it is needed. The tripping energy is supplied from the line leads A, B and C. A limited amount of energy is stored in the storage capacitor C4 and this is used to maintain the SCR Q2 in conduction. It has been found that although the solenoid 2 only has a half wave input, sufficient energy is provided for it's operation. If the SCR Q2 were triggered between positive half cycles, and one of the three phases were not energized, the SCR Q2 would be turned on and held in the conducting state by current supplied through the diode D13 and the resistor R11 from the storage capacitor C4.

Figure 4A:
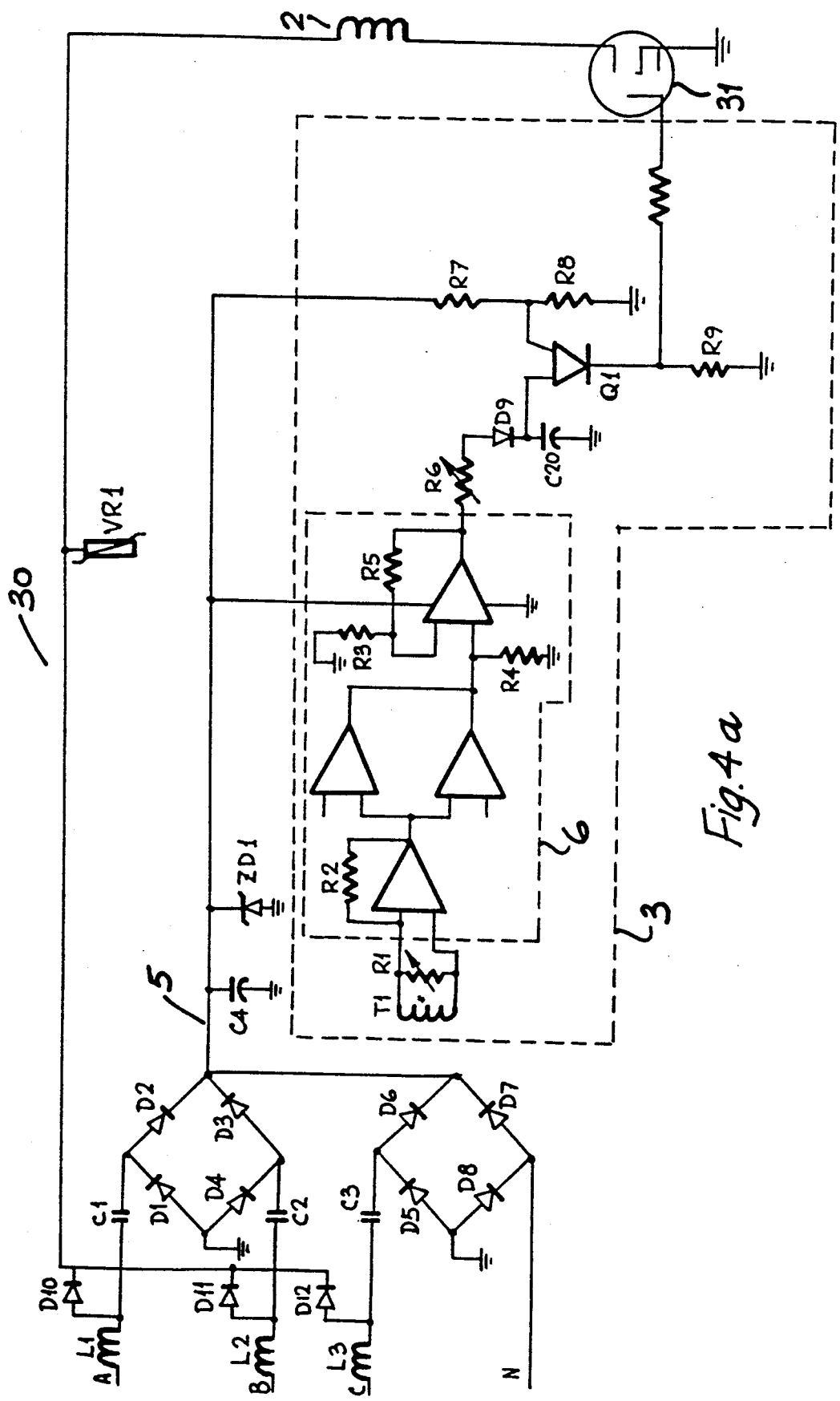
FIGS. 4(a) and 4(b) are circuit diagrams of further arrangements of power supplies which are essentially variations of that of FIG. 3.
Figure 4B:
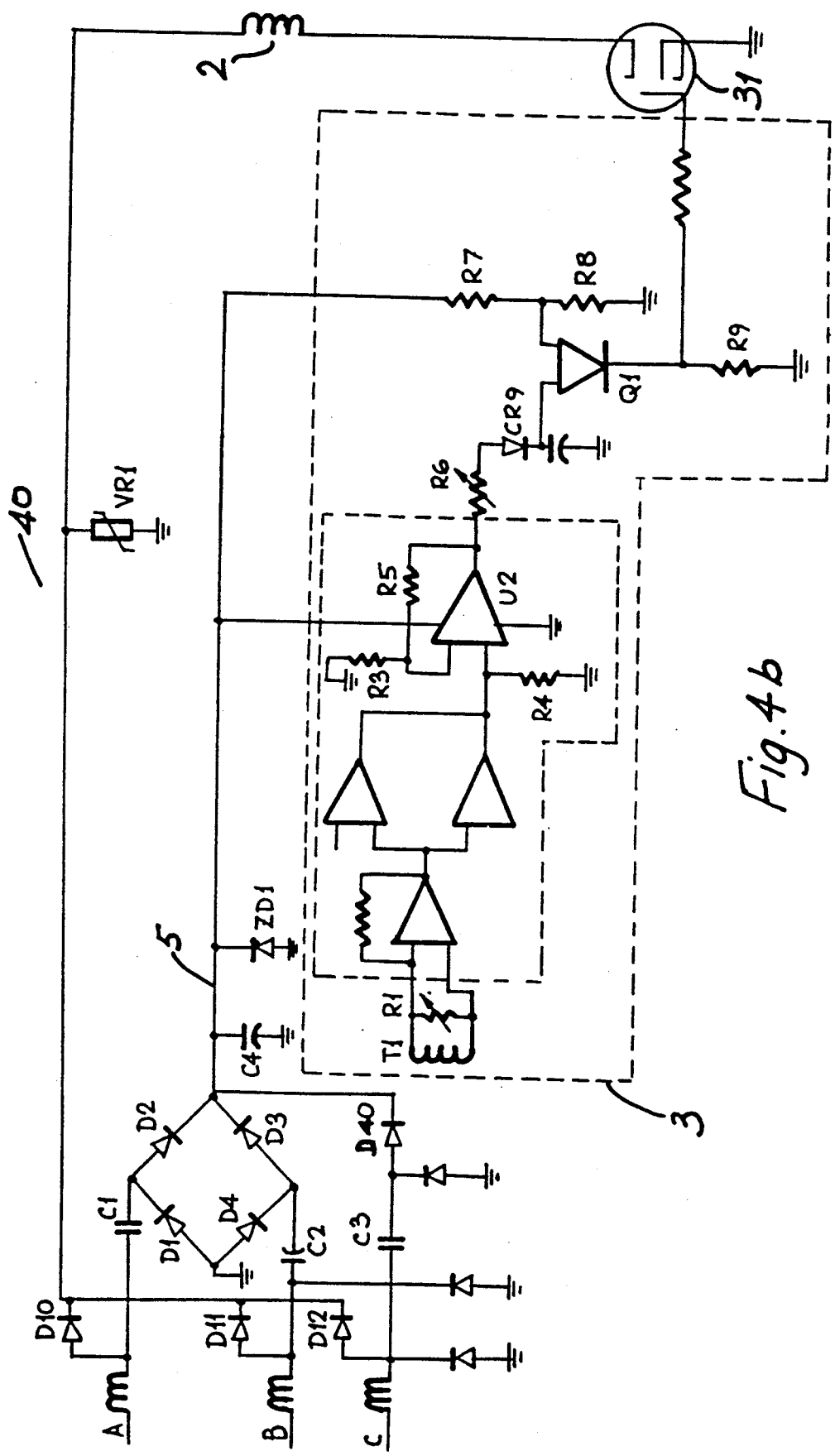

Referring now to FIGS. 4(a) and 4(b), variations on the power supply 20 are illustrated generally by the reference numerals 30 and 40, respectively. Again, parts similar to those described with reference to the previous drawings are identified similarly. The power supply 30 includes a circuit breaker having a VMOS transistor 31 instead of an SCR. In this case, because the VMOS transistor 31 turns off after a predetermined time, there is no need for the rectifier output lead 5 to be connected to maintain it in conduction. This arrangement allows the power supply to be connected to either the line or the load end of the interrupter contacts. This is an advantage over the use of an SCR, because when an SCR is used, the connection must be made on the load side of the interrupter so that the voltage source will be removed when tripping occurs. If such power supplies are connected on the line side of the interrupter, the tripping device would be continually energized after tripping. This could lead to "burnout of the tripping solenoid".

The power supplies described above have four wire, three phase connections and thus operate if any one of the phases and neutral is present. The power supply 40 of FIG. 4(b) operates with a three wire, three phase connection and will thus operate with two of the three phases present. Only one bridge rectifier is used and this is connected to the line leads A and B, the line lead C being connected through a diode D40 to the rectifier output lead 5.

In the arrangements of FIGS. 3 and 4(a), the power supply will operate if any one of the phases and neutral are present and thus will not operate without the neutral. The circuit of FIG. 4(b), however, will operate if any two lines are present.

Although the power supplies illustrated all include a ground fault detection circuit it will be appreciated that any type of fault detection circuit may be incorporated.

It will also be appreciated that the invention provides a power supply which in a simple manner includes protection against applied DC and is also arranged to supply a fault detection circuit and circuit breaker with sufficient tripping energy.

Various changes, modifications and variations may be made to the arrangements described without departing from the scope of the invention.

What is claimed is:

1. A low current power supply incorporating a circuit breaker and fault detection circuit means for supplying tripping energy for said circuit breaker, said power supply being subject to dielectric testing with a high DC voltage, comprising:
   line and neutral power leads;
   rectifier means coupled to said line and neutral power leads for supplying power to said fault detection circuit means; and
   a capacitor, on the order of 0.1 microfarads, individually coupled between each of said line power leads and said rectifier means for protecting said power supply from said high DC voltage.

2. The supply of claim 1 further including an operating solenoid in said circuit breaker coupled to said fault detection circuit means.

3. The supply of claim 2 wherein said solenoid is connected to said line lead by additional rectifier means.

4. The supply of claim 3 wherein said fault detection circuit means includes a solid state switch in series with said solenoid.

5. The supply of claim 4 further including voltage transient suppression means coupled to said line lead.

* * * * *